(12) United States Patent
Eyer et al.

(10) Patent No.: US 8,607,265 B2
(45) Date of Patent: Dec. 10, 2013

(54) PRIVATE USER DATA

(75) Inventors: Mark Kenneth Eyer, Woodinville, WA (US); Robert Noel Blanchard, Escondido, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 0 days.

(21) Appl. No.: 11/982,531

(22) Filed: Nov. 1, 2007

(65) Prior Publication Data
US 2008/0141299 A1 Jun. 12, 2008

Related U.S. Application Data (60) Provisional application No. 60/873,697, filed on Dec. 7, 2006.

(51) Int. Cl.
*H04N 7/10* (2006.01)
*H04H 60/32* (2008.01)

(52) U.S. Cl.
USPC .................................. 725/32; 725/36; 725/19

(58) Field of Classification Search
USPC .......................................................... 725/32
See application file for complete search history.

(56) References Cited

U.S. PATENT DOCUMENTS

| 2004/0017852 | A1  | 1/2004  | Garrido et al. | |
|---|---|---|---|---|
| 2004/0021549 | A1* | 2/2004  | Choi et al. | 340/5.8 |
| 2004/0216171 | A1* | 10/2004 | Barone et al. | 725/135 |
| 2006/0059509 | A1* | 3/2006  | Huang et al. | 725/32 |
| 2007/0040934 | A1* | 2/2007  | Ramaswamy et al. | 348/385.1 |
| 2007/0089157 | A1* | 4/2007  | Clark | 725/135 |

OTHER PUBLICATIONS

Lechner, Bernard J., et al., The ATSC Transport Layer, Including Program and System Information Protocol (PSIP), 2006 (http://ieeexplore.ieee.org/iel5/01566622.pdf).

Advanced Television Systems Committee, ATSC Standard: Program and System Information Protocol for Terrestrial Broadcast and Cable (Revision C) With Amendment No. 1, 2006 (http://www.atsc.org/standards/a_65cr1_with_amend_1.pdf).

* cited by examiner

*Primary Examiner* — Brian Pendleton
*Assistant Examiner* — Jean D Saint Cyr
(74) *Attorney, Agent, or Firm* — Blakey, Sokoloff, Taylor & Zafman LLP (57) ABSTRACT

An embodiment of the present invention includes a technique for inserting private user data. A user data identifier (UDI) associated with a pre-defined data structure is inserted into a data sequence within a content stream. The UDI is registered with a registration authority and is different from a standard identifier that is defined by a standard organization in a published standard document. The data is inserted into the data sequence according to the pre-defined data structure. The data sequence has the UDI and the private user data and is packetized into a transport stream.

Another embodiment of the present invention includes a technique for extracting private user data. A data sequence in a packetized transport stream is parsed to obtain a user data identifier (UDI) associated with a pre-defined data structure. The UDI is registered with a registration authority and is different from a standard identifier that is defined by a standard organization in a published standard document. The UDI is recognized. The private user data is extracted from the data sequence according to the pre-defined data structure corresponding to the recognized UDI.

15 Claims, 7 Drawing Sheets

PRIVATE USER DATA

RELATED APPLICATION

This application claims the benefit of the provisional application, titled, "Private User Private Data", Ser. No. 60/873,697, filed on Dec. 3, 2006.

BACKGROUND

1. Field of the Invention

Embodiments of the invention relate to the field of video broadcast, and more specifically, to private user data in broadcast video.

2. Description of Related Art

Motion Picture Experts Group (MPEG)-2 video standard provides format for broadcast quality video with resolutions up to 1920×1080 and beyond. The MPEG-2 video standard specifies video bitstream syntax as described in the specification document published by the International Organization for Standardization (ISO)/the International Electro-technical Commission (IEC), Document No. 13818-2, 2000 The video bitstream syntax includes format for video sequence, sequence header, and extension and user data. The user data concept is intended as a general purpose container for types of data not to be described in an ISO standard, such as data provided by private entities. However, the MPEG-2 video standard does not address how a receiving device may identify the owner of a particular block of private user data it may encounter. The originator of the private data block establishes its format and content. Therefore, reliable determination of the identity of the originator is essential for the receiver to successfully access and use of private data.

The MPEG-2 video standard is used in the Digital Television (TV) standards supported by the Advanced Television Systems Committee, Inc. (ATSC), among others. ATSC is an organization that develops standards for digital television. The ATSC DTV standard describes the picture user data syntax that includes a four-byte field used to identify the structure and contents of the data to follow. The ATSC user data identifier is specifically defined by ATSC as consisting only of pre-defined (standardized) values identifying standardized data structures. The ATSC standard specifically states that receiving devices are expected to discard any unrecognized video user data encountered in the video bit stream.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique for inserting private user data. A user data identifier (UDI) associated with a pre-defined data structure is inserted into a data sequence within a content stream. The value of the UDI is registered with a registration authority and is different from a standard identifier that is defined by a standard organization in a published standard document. The data is inserted into the data sequence according to the pre-defined data structure. The data sequence has the UDI and the private user data and is packetized into a transport stream.

Another embodiment of the present invention includes a technique for extracting private user data. A data sequence in a packetized transport stream is parsed to obtain a user data identifier associated with a pre-defined data structure. The user data identifier is recognized as being that of a known private entity. The data is extracted from the data sequence according to the pre-defined data structure when the user data identifier is recognized.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to insert private user data into a data sequence to be transmitted to a receiver, and to extract the private user data embedded in a data sequence. The data sequence may be a sequence including media information such as video. The transmission/reception may be wired or wireless. The data sequence may be part of a content packaged by a content provider or source. The content may be delivered to content subscribers in a number of ways such as broadcast (e.g., satellite, terrestrial, cable networks), Internet, wireless transmissions, etc.

In one embodiment, the data sequence is a video sequence encoded according to a media standard such as the MPEG-2 video standard. A user data identifier is inserted into the data sequence according to a syntax defined by the media standard. The user data identifier is a pre-defined identifier established by a private entity. The user data identifier is associated with a pre-defined data structure. The user data identifier is registered with a registration authority such as the Society of Motion Picture and Television Engineers (SMPTE) registration authority (RA). The user data identifier is different from a standard identifier that is supported by a standard organization such as the Advanced Television Systems Committee (ATSC) or Society of Cable Telecommunications Engineers (SCTE) organizations. The private user data is then inserted into the data sequence according to the pre-defined data structure as specified by the syntax. The data sequence is then packetized to be transmitted to the media subscribers.

At the receiving end, the received transport stream is processed. The data sequence having the embedded user data identifier and the private user data is parsed to obtain the user data identifier. The user data identifier is matched with the pre-defined identifier to be recognized as the identifier of the private entity. The private user data is then extracted according to the pre-defined data structure when the user data identifier is recognized. The private user data is then forwarded to an application that processes the private user data.

Figure 1:
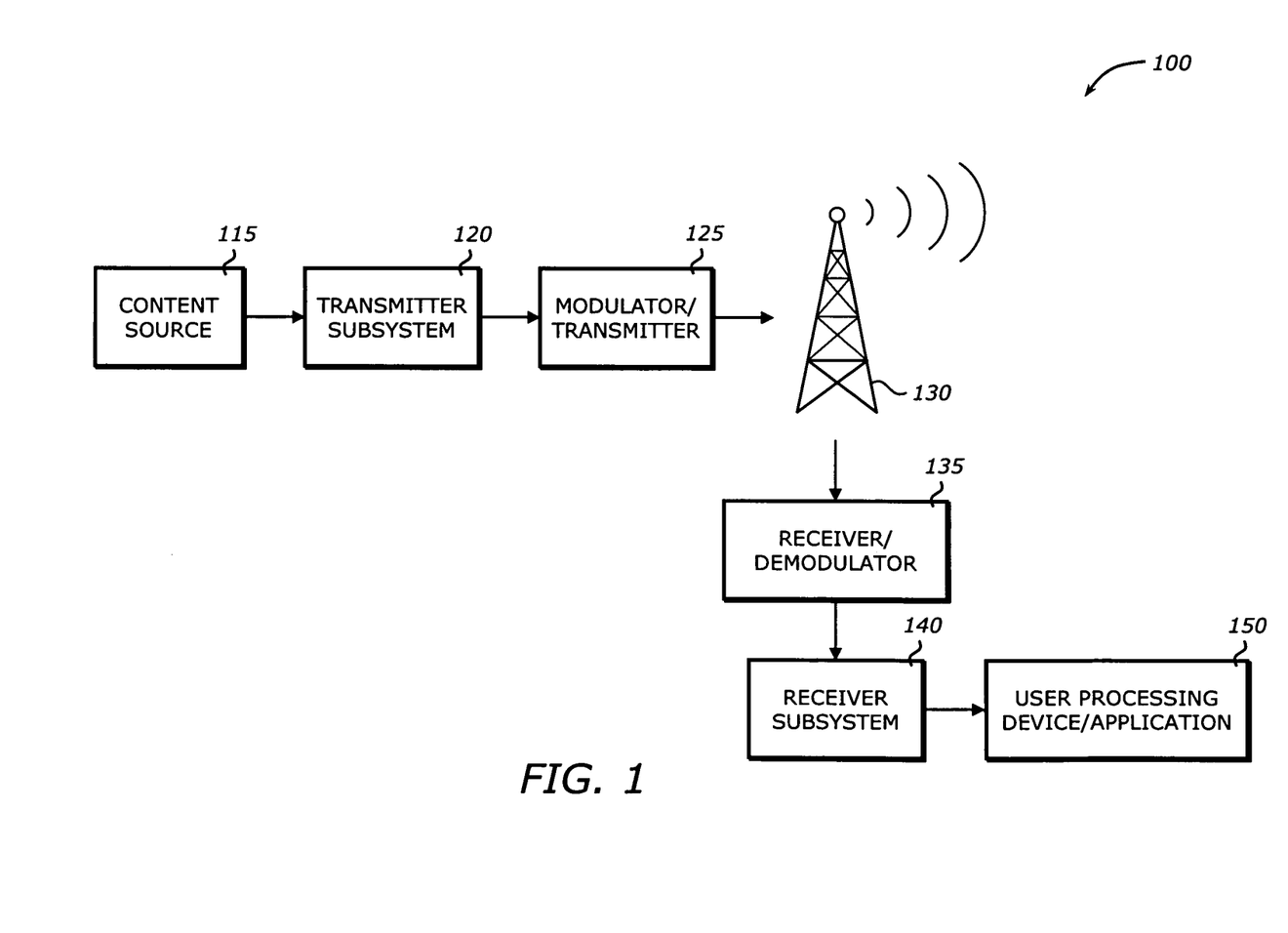
FIG. 1 is a diagram illustrating a system according to one embodiment of the invention.

FIG. 1 is a diagram illustrating a system 100 according to one embodiment of the invention. The system 100 includes a content source 115, a transmitter subsystem 120, a modulator/transmitter 125, a transmitter station 130, a receiver/demodulator 135, a receiver subsystem 140, and a user processing device/application 150.

The content source 115 may be a broadcast program network, a cable operator, a video-on-demand (VOD) multiple system/service operator (MSO), a content distributor, or any content provider or system/service operator that provides, delivers, or distributes the content materials to a number of content subscribers.

The transmitter subsystem 120 prepares, packages, or formats the content from the content source 115 into a stream for transmission. In one embodiment, the transmitter subsystem 120 implements a transport layer according to the ATSC Digital Television standard. The ATSC transport layer is based on the MPEG-2 transport stream (TS) format, as defined by the MPEG-2 Systems standard. The MPEG-2 TS provides a mechanism to encapsulate and multiplex coded video, coded audio, and generic data into a unified bitstream.

The modulator/transmitter 125 modulates the stream from the transmitter subsystem 120 for transmission. The modulator/transmitter 125 may include vestigial sideboard (VSB) modulator, radio frequency (RF) up-converter, and transmitter to convert the stream into a signal to the transmitter station 130. The transmitter station 130 may include a high-powered antenna to broadcast the signal containing the content.

The receiver/demodulator 135 may include a receiver antenna to receive the broadcast signal, a demodulator to demodulate the RF signal to base-band signal, analog-to-digital converter to convert the analog signal into digital bitstream, and error detection and/or correction circuitry.

The receiver subsystem 140 processes the resulting bitstream to extract the private user data to be delivered to the user processing device/application 150. The receiver subsystem 140 may be a part of a set-top box (STB) or integrated with the receiver/demodulator 135 into a STB. The user processing device/application 150 may be any device or application that processes the extracted private user data.

Figure 2:
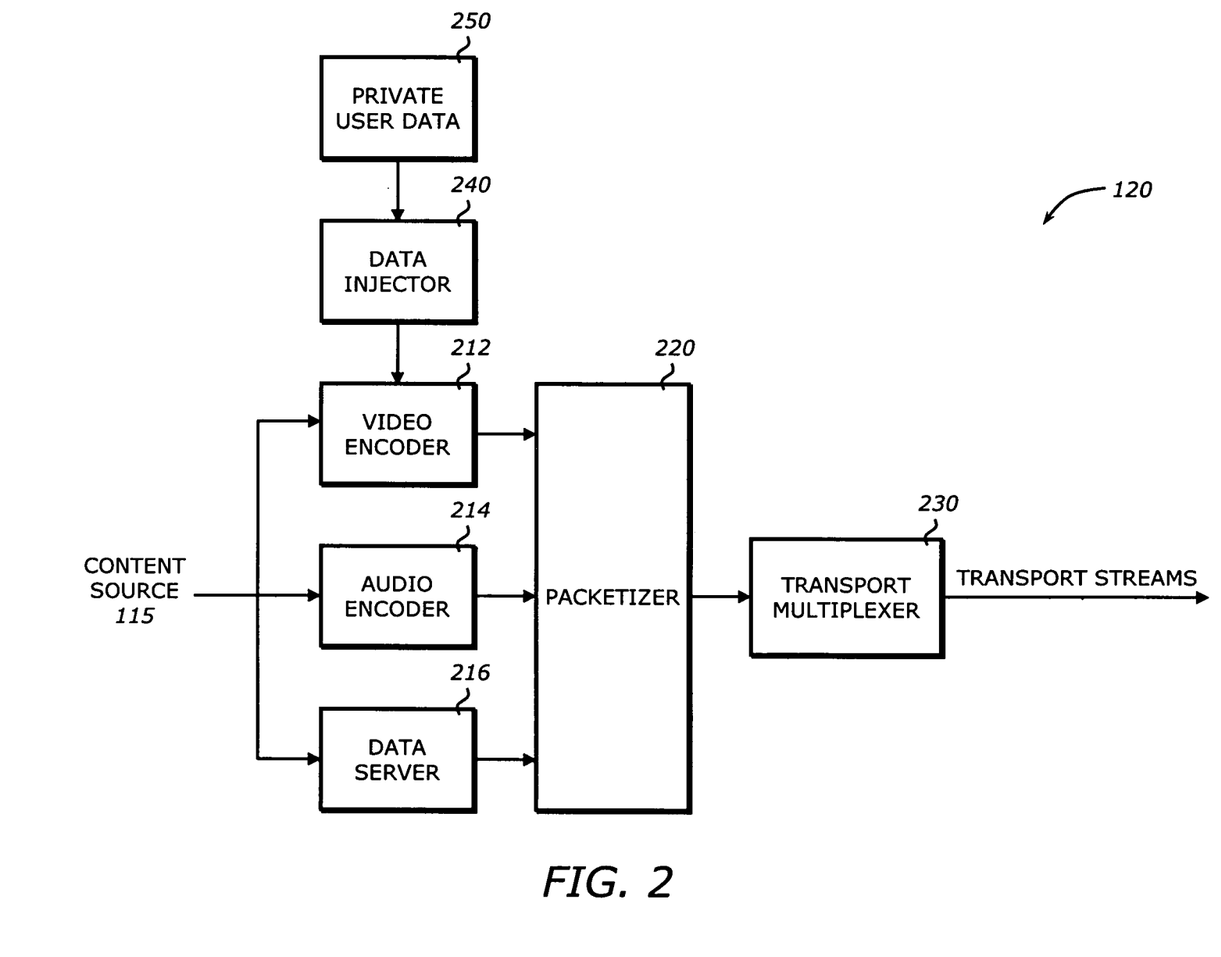
FIG. 2 is a diagram illustrating a transmitter subsystem according to one embodiment of the invention.

FIG. 2 is a diagram illustrating the transmitter subsystem 120 shown in FIG. 1 according to one embodiment of the invention. The transmitter subsystem 120 includes a video encoder 212, an audio encoder 214, a data server 216, a packetizer 220, a transport multiplexer 230, a data injector 240, and private user data 250.

The video encoder 212 and the audio encoder 214 encode video and audio information, respectively, according to a pre-defined format or syntax. In one embodiment, this format is the MPEG-2 standard. The data server 216 is a server that provides data other than the video and audio information. The video encoder 212, audio encoder 214, and data server 216 provide the respective elementary streams to the packetizer 220.

The packetizer 220 packetizes the video, audio, and server data elementary streams into Packetized Elementary Stream (PES) packets according to the standard. The multiplexer 220 multiplexes the video, audio, and data packetized elementary streams (PESs) into a transport stream. The packetizing and multiplexing may follow a standard such as the MPEG-2 standard as described in the ISO/IEC 13818-1 (MPEG-2 Systems) standard.

The data injector 240 injects private user data into the video encoder 212 to allow a private entity to transmit its private user data 250 using the currently defined broadcast standard such as the ATSC standard. The private user data 250 may be any information, data, or content that a private entity wants to be embedded in the transport stream. The data injector 240 may be located at any convenient place to inject the private user data. In one embodiment, it may inject private user data 250 into a video sequence in the video encoder 212.

Figure 3:
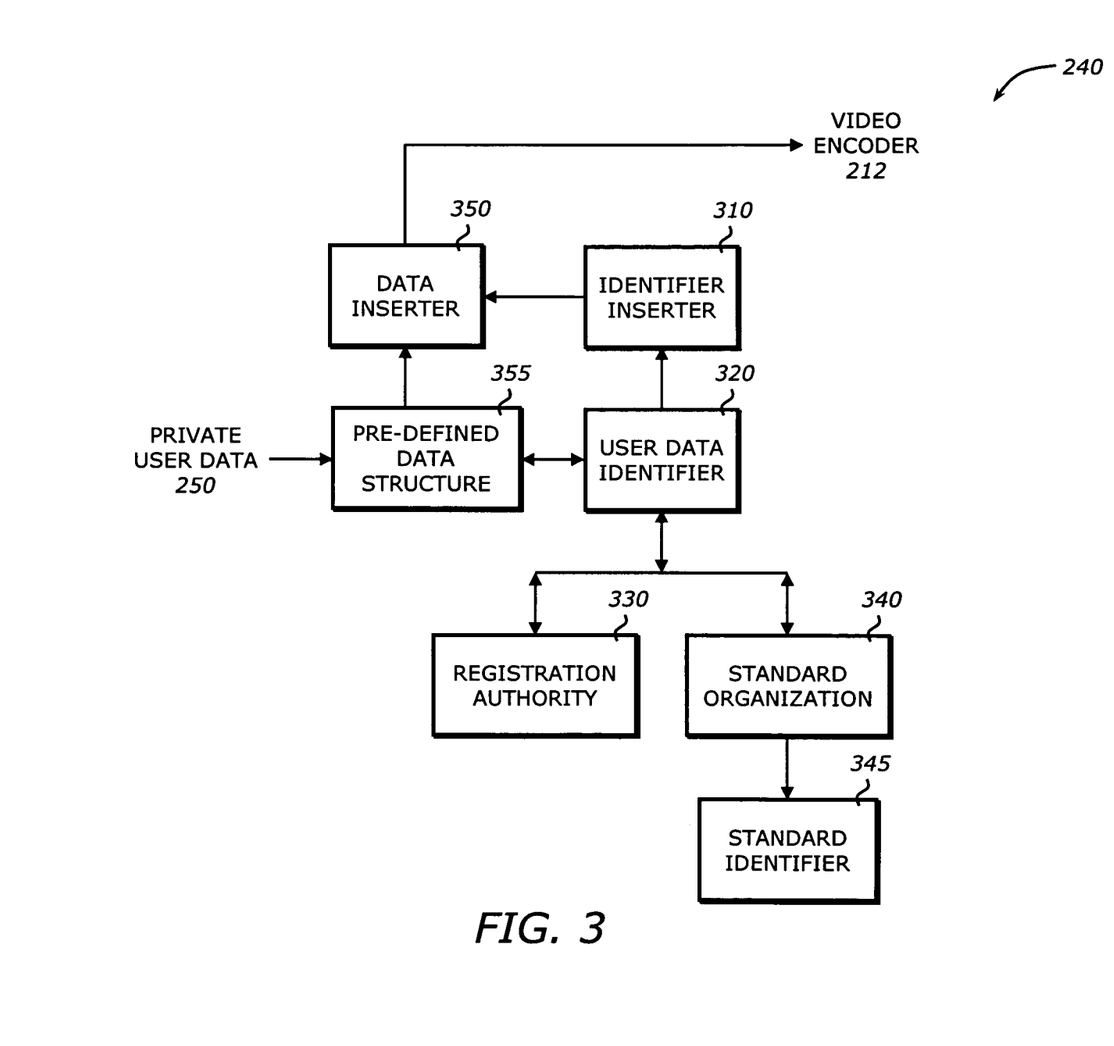
FIG. 3 is a diagram illustrating a data injector according to one embodiment of the invention.

FIG. 3 is a diagram illustrating the data injector 240 shown in FIG. 2 according to one embodiment of the invention. The data injector 240 includes an identifier inserter 310 and a data inserter 350. The data injector 240 may include more or less than these components depending on the system configuration and its location. It is noted that these components may represent hardware circuits, software modules, or any combination of hardware or software.

The identifier inserter 310 inserts a user data identifier (UDI) 320 into the data sequence from the content source 115. The data sequence may be a video sequence that may contain private user data. The user data identifier 320 may be in any suitable format. In one embodiment, it is a 32-bit identifier. The UDI 320 is associated with a pre-defined data structure 355. The pre-defined data structure 355 may be any suitable data structure. For example, it may be a sequence of data of any length and/or word size (e.g., 8-bit).

The UDI 320 is registered with a registration authority (RA) 330. The RA 330 may be any entity or authority that has been authorized by a standard organization to register identifiers from business entities. In one embodiment, the UDI 320 is registered with the SMPTE RA. The SMPTE is authorized by the ISO to register MPEG-2 format identifiers according to the ISO/IEC 13818-1 document. The UDI 320 is, therefore, the same as the format identifier registered with the SMPTE RA.

In addition, the UDI 320 is different from a standard identifier 345 that is supported by a standard organization 340. The standard identifier 345 is an identifier that is recognized by the standard organization 340. The standard organization 340 may be an organization that administers the standardization of formats of information transmission used in the system 100 shown in FIG. 1. The standard organization 340 may be the same or different than the standard organization that authorizes the RA 330. In one embodiment, the standard organization 340 is the Advanced Television Systems Committee (ATSC) organization.

The ATSC standards specify MPEG-2 video syntax and semantics including picture extension and user data syntax. The picture extension and user data syntax is constructed according to the ISO/IEC 13818-2 (Section 6.2.2.2) as follows:

```
extension_and_user_data(2) {
    while ((nextbits( ) == extension_start_code ) ||
        (nextbits( ) == user_data_start_code)) {
            if (nextbits( ) == extension_start_code)
                extension_data(2)
            if (nextbits( ) == user_data_start_code)
                user_data( )
```

The picture user data syntax is as follows:

```
user_data( ) {
    user_data_start_code
    user_data_identifier
    user_structure( )
}
```

The user_data_start_code and the user_data_identifier are 32-bit data. The UDI 320 is the user_data_identifier in the above syntax. The user_data_identifier is a 32-bit code. The user_structure( ) is a variable length data structure defined by the value of the user_data_identifier.

The standard identifier 345 is one of the user data identifier values recognized by the standard organization 340. For example, the ATSC specifies two values for the user_data_identifier as "GA94" and "DTG1". The ATSC standard states that all other values are not defined in their standard document. The ATSC recommends that if the user_data_identifier is unrecognized (i.e., if it is different than the above approved codes), the user data should be discarded. However, if this recommendation is strictly followed, any private entities who wish to transmit private user data will not be able to do so. Accordingly, the UDI 320 is selected to be different that the standard identifier 345 and is selected to be matched with a pre-defined identifier established by a private entity. This pre-defined identifier is then used in the receiving end to allow the decoder to extract the private user data.

The data inserter 350 inserts the private user data 250 into the data sequence according to the pre-defined data structure 355 as specified by the UDI 320. The private user data 250 may be any data, information, or content provided by a private entity. The private user data 250 may come from any suitable source such as mass storage media (e.g., tape, flash memory, disk), semiconductor memories, or transmitted via wired or wireless connections. The data inserter 350 may be integrated with the identifier inserter 310.

Figure 4:
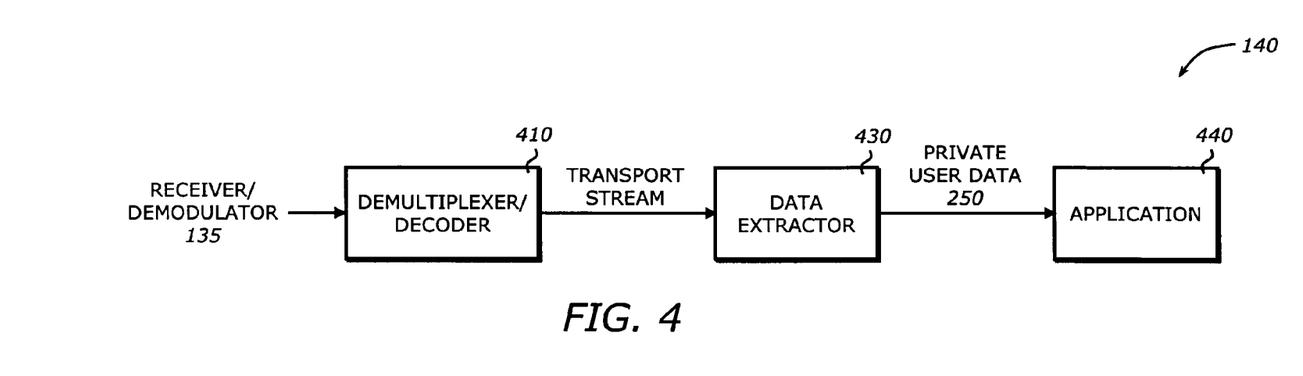
FIG. 4 is a diagram illustrating a receiver subsystem according to one embodiment of the invention.

FIG. 4 is a diagram illustrating the receiver subsystem 140 shown in FIG. 1 according to one embodiment of the invention. The receiver subsystem 140 includes a demultiplexer/decoder 410, a data extractor 430, and an application 440. As described above, these components may represent hardware circuits, software modules, or any combination of hardware and software.

The demultiplexer/decoder 410 decodes the received bitstream to reconstruct the program stream and the transport stream. The demultiplexer/decoder 410 may include a channel-specific decoder, an error detection and correction decoder, or any other suitable decoding functions.

The data extractor 430 extracts the private user data 250 embedded in the packetized transport stream. The data extractor 430 then forwards the extracted private user data 250 to the application 440. The application 440 processes the private user data 250 as appropriate to its purpose and function.

Figure 5:
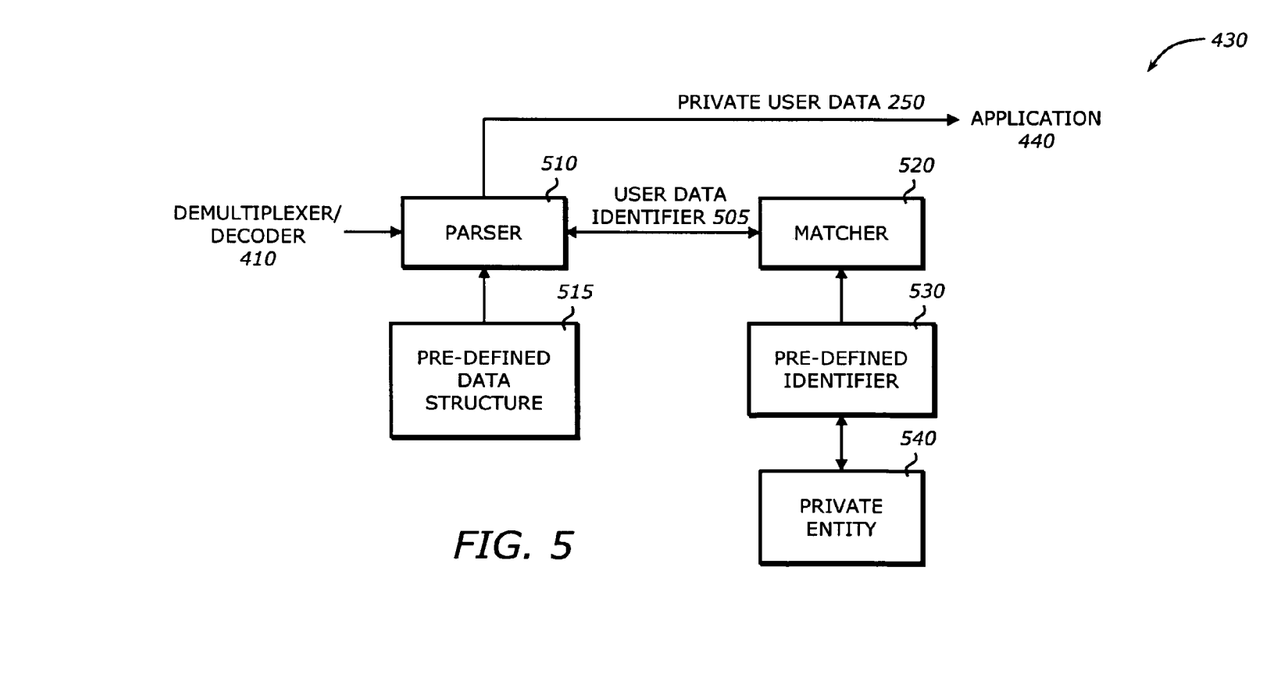
FIG. 5 is a diagram illustrating a data extractor according to one embodiment of the invention.

FIG. 5 is a diagram illustrating the data extractor 430 shown in FIG. 4 according to one embodiment of the invention. The data extractor 430 includes a parser 510 and a matcher 520.

The parser 510 parses a data sequence in a packetized transport stream to obtain a user data identifier (UDI) 505. The UDI 505 is associated with a pre-defined data structure 515 specified by a syntax defined by a media standard. The syntax specifies a location of the pre-defined data structure 515. The UDI 505 is registered with a registration authority (RA) and is different from a standard identifier that is defined by a standard organization in a published standard document.

The pre-defined data structure 515 is the same as the pre-defined data structure 355 used by the data inserter 350 shown in FIG. 3. The RA, the standard identifier, and the standard organization are the same as the RA 330, the standard identifier 345, and the standard organization 340, respectively, shown in FIG. 3.

The matcher 520 matches the extracted UDI 505 with a pre-defined identifier 530 established by a private entity 540. If there is a match, the extracted UDI 505 is recognized as a valid identifier from the private entity 540 indicating that there is private user data embedded in the transport stream. The matcher 520 then informs the parser 510 to proceed with the extraction of the private user data 250 according to the pre-defined data structure 515. The extracted private user data 250 is then delivered to the user processing device/application 150.

The matcher 520 may match the extracted UDI to determine if it matches the standard identifier supported by the standard organization. If the extracted UDI 505 matches with any of the standard identifiers, the matcher 520 may inform other parts of the data extractor to extract the data accordingly.

Figure 6:
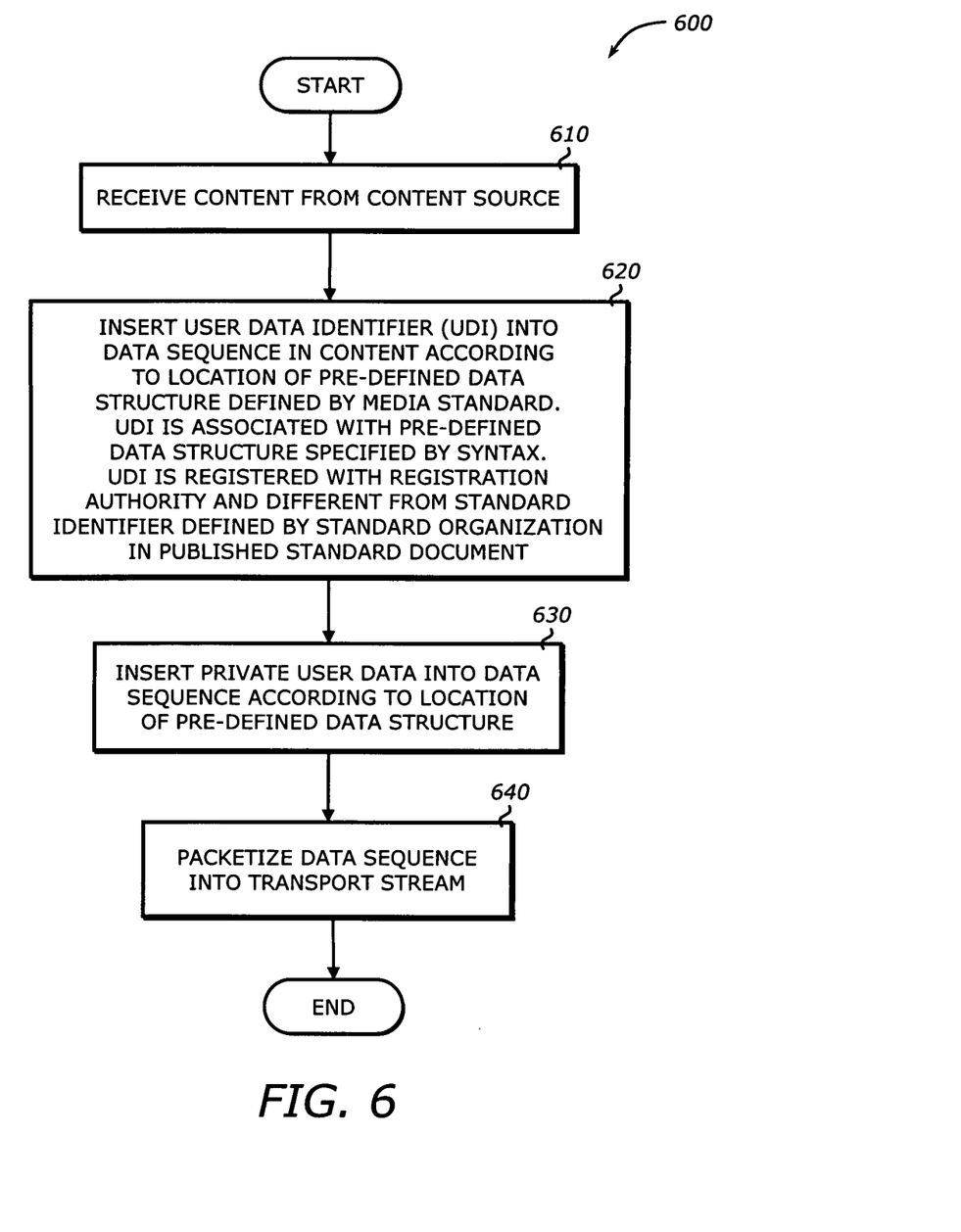
FIG. 6 is a flowchart illustrating a process to perform data injection according to one embodiment of the invention.

FIG. 6 is a flowchart illustrating a process 600 to perform data injection according to one embodiment of the invention.

Upon START, the process 600 receives a content stream from a content source (Block 610). Next, the process 600 inserts the user data identifier (UDI), according to a syntax defined by a media standard, into a data sequence in the content (Block 620). The syntax specifies a location of the pre-defined data structure. The UDI is associated with a pre-defined data structure. It is registered with a registration authority that is responsible for registering a format identifier of the stream. It is different from the standard identifier defined by a standard organization in a published standard document. In one embodiment, the registration authority is a SMPTE registration authority, the standard organization is an ATSC organization, and the media standard is an MPEG standard (e.g., MPEG-2).

Next, the process 600 inserts private user data into the data sequence according to the location (Block 630). Then, the process 600 packetizes the data sequence into the transport stream (Block 640). The process 600 is then terminated.

Figure 7:
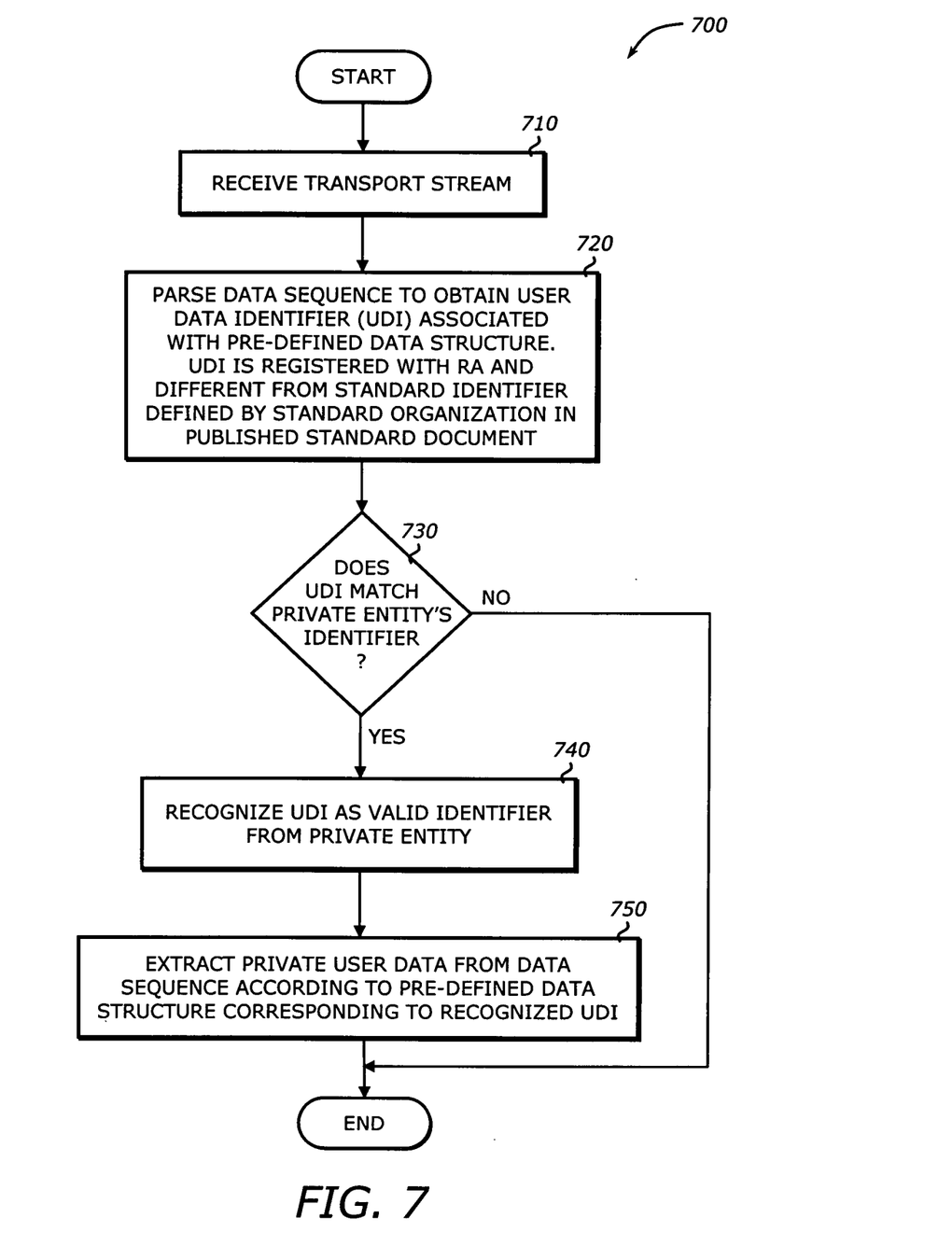
FIG. 7 is a flowchart illustrating a process to perform data extraction according to one embodiment of the invention.

FIG. 7 is a flowchart illustrating a process 700 to perform data extraction according to one embodiment of the invention.

Upon START, the process 700 receives a transport stream containing private user data 250 (Block 710). Next, the process 700 parses a data sequence according to a syntax defined by a media standard to obtain a user data identifier (UDI) (Block 720). The UDI is associated with a pre-defined data structure as specified by the syntax. The syntax specifies a location of the pre-defined data structure. The UDI is registered with a registration authority that is responsible for registering a format identifier of the stream. It is different from the standard identifier defined by a standard organization in a published standard document. In one embodiment, the registration authority is a SMPm registration authority, the standard organization is an ATSC organization, and the media standard is an MPEG standard (e.g., MPEG-2).

Next, the process 700 determines if the UDI matches with a private entity's identifier (Block 730). If not, the process 700 is terminated. Otherwise, the process 700 recognizes the UDI as a valid identifier from the private entity (Block 740). Then, the process 700 extracts the private user data 250 from the data sequence according to the location (Block 750). The parsing comprises extracting private user data from the data sequence according to the pre-defined data structure corresponding to the recognized UDI. The private user data 250 may then be used in an application 440. The process 700 is then terminated.

Figure 8:
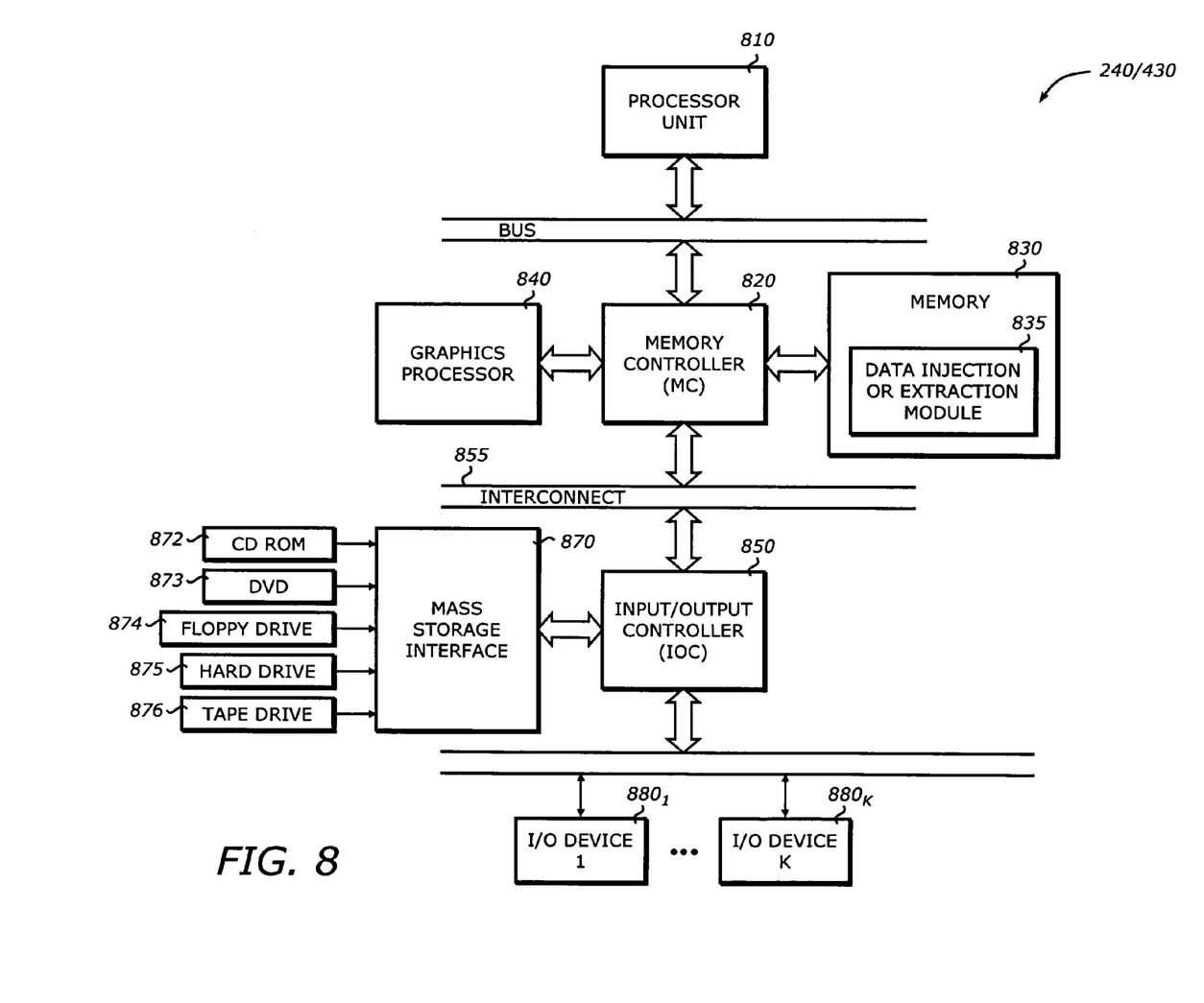
FIG. 8 is a diagram illustrating a data injector/extractor according to one embodiment of the invention

FIG. 8 is a diagram illustrating the data injector 240 or data extractor 430 shown in FIGS. 2 and 4, respectively according to one embodiment of the invention. The data injector 240 or data extractor 430 includes a processor unit 810, a memory controller (MC) 820, a main memory 830, a graphics processor 840, an input/output controller (IOC) 850, an interconnect 855, a mass storage interface 870, and input/output (I/O) devices $880_1$ to $880_K$. The data injector 240 or data extractor 430 may contain more or less than the above components.

The processor unit 810 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 820 provides control and configuration of memory and input/output devices such as the main memory 830 and the IOC 840. The MC 820 may be integrated into a chipset that integrates multiple functionalities such as graphics, media, isolated execution mode, host-to-peripheral bus interface, memory control, power management, etc. The MC 820 or the memory controller functionality in the MC 820 may be integrated in the processor unit 810. In some embodiments, the memory controller, either internal or external to the processor unit 810, may work for all cores or processors in the processor unit 810. In other embodiments, it may include different portions that may work separately for different cores or processors in the processor unit 810.

The main memory 830 stores system code and data. The main memory 830 is typically implemented with dynamic random access memory (DRAM), static random access memory (SRAM), or any other types of memories including those that do not need to be refreshed. The main memory 830 may include multiple channels of memory devices such as DRAMs. The main memory 830 may include a data injection or extraction module 835. The data injection or extraction module 835 includes program instructions and data to perform data injection or extraction functions.

The graphics processor 840 is any processor that provides graphics functionalities. The graphics processor 840 may also be integrated into the MC 820 to form a Graphics and Memory Controller (GMC). The graphics processor 840 may be a graphics card such as the Graphics Performance Accelerator (AGP) card, interfaced to the MC 820 via a graphics port such as the Accelerated Graphics Port (AGP) or a peripheral component interconnect (PCI) Express interconnect. The graphics processor 840 provides interface to an external display device such as standard progressive scan monitor, television (TV)-out device, and Transition Minimized Differential Signaling (TMDS) controller.

The IOC 850 has a number of functionalities that are designed to support I/O functions. The IOC 850 may also be integrated into a chipset together or separate from the MC 820 to perform I/O functions. The IOC 850 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 855 provides interface to peripheral devices. The interconnect 855 may be point-to-point or connected to multiple devices. For clarity, not all interconnects are shown. It is contemplated that the interconnect 855 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 870 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 872, digital versatile disc (DVD) 873, floppy drive 874, hard drive 875, tape drive 876, and any other magnetic or optic storage devices. The mass storage device provides a mechanism to read machine-accessible media.

The I/O devices $880_1$ to $880_K$ may include any I/O devices to perform I/O functions. Examples of I/O devices $880_1$ to $880_K$ include controller for input devices (e.g., keyboard, mouse, trackball, pointing device, and remote control unit), media card (e.g., audio, video, and graphic), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations or actions described above. The term "information" or "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    inserting a user data identifier (UDI) into a video sequence within a content stream encoded according to a media standard, wherein the media standard defines a syntax that defines a location for a pre-defined data structure, wherein the pre-defined data structure is a variable length data structure and a format of the pre-defined data structure is defined by a value included in the UDI, the UDI being registered with a registration authority that is responsible for registering a format identifier for the content stream, wherein the media standard is an Motion Picture Experts Group (MPEG) standard, and wherein the UDI is different from an Advanced Television Systems Committee (ATSC) standard identifier; and
    inserting private user data into the video sequence at the location for the pre-defined data structure, wherein the private user data is information, data, or content embedded by a private entity, the video sequence having the UDI and the private user data and being packetized into a transport stream,
    wherein the UDI is selected to be matched with a pre-defined identifier established by the private entity, wherein the pre-defined identifier is used in the receiving end to allow a decoder to extract the private user data.

2. The method of claim 1, wherein the syntax defines the location of the pre-defined data structure using a 32-bit user data start code (user_data_start_code), and wherein the UDI is a 32-bit code (user_data_identifier).

3. The method of claim 1 wherein
    the UDI is a pre-defined identifier established by the private entity.

4. The method of claim 1 wherein inserting the private user data comprises:
    inserting the private user data into the video sequence comprising a video bitstream.

5. The method of claim 1 wherein the registration authority is a Society of Motion Picture and Television Engineers (SMPTE) authority.

6. An article of manufacture comprising:
    a machine-accessible non-transitory storage medium including information that, when accessed by a machine, cause the machine to perform operations comprising:
    inserting a user data identifier (UDI) into a video sequence within a content stream encoded according to a media standard, wherein the media standard defines a syntax that defines a location for a pre-defined data structure, wherein the pre-defined data structure is a variable length data structure and a format of the pre-defined data structure is defined by a value included in the UDI, the UDI being registered with a registration authority that is responsible for registering a format identifier for the content stream, wherein the media standard is an Motion Picture Experts Group (MPEG) standard, and wherein the UDI is different from an Advanced Television Systems Committee (ATSC) standard identifier; and
    inserting private user data into the video sequence at the location for the pre-defined data structure, wherein the private user data is information, data, or content embedded by a private entity, the video sequence having the UDI and the private user data and being packetized into a transport stream,
    wherein the UDI is selected to be matched with a pre-defined identifier established by the private entity, wherein the pre-defined identifier is used in the receiving end to allow a decoder to extract the private user data.

7. The article of manufacture of claim 6 wherein
    the syntax defines the location of the pre-defined data structure using a 32-bit user data start code (user_data_start_code), and wherein the UDI is a 32-bit code (user_data_identifier).

8. The article of manufacture of claim 6 wherein the information causing the machine to perform inserting the UDI comprises information that, when accessed by a machine, cause the machine to perform operations comprising:
    inserting the UDI being a pre-defined identifier established by the private entity.

9. The article of manufacture of claim 7 wherein the registration authority is a Society of Motion Picture and Television Engineers (SMPTE) authority.

10. An apparatus comprising:
    an identifier inserter to insert a user data identifier (UDI) into a video sequence in a content stream encoded according to a media standard, wherein the media standard defines a syntax that defines a location for a pre-defined data structure, wherein the pre-defined data structure is a variable length data structure and a format of the pre-defined data structure is defined by a value included in the UDI, the UDI being registered with a registration authority that is responsible for registering a format identifier for the content stream, wherein the media standard is an Motion Picture Experts Group (MPEG) standard, and wherein the UDI is different from an Advanced Television Systems Committee (ATSC) standard identifier;

a data inserter to insert private user data into the video sequence at the location for the pre-defined data structure, wherein the private user data is information, data, or content embedded by a private entity, wherein the UDI is selected to be matched with a pre-defined identifier established by the private entity, wherein the pre-defined identifier is used in the receiving end to allow a decoder to extract the private user data; and a packetizer to packetize the video sequence into a transport stream.

11. The apparatus of claim 10 wherein the syntax defines the location of the pre-defined data structure using a 32-bit user data start code (user_data_start_code), and wherein the UDI is a 32-bit code (user_data_identifier).

12. The apparatus of claim 10 wherein the registration authority is a Society of Motion Picture and Television Engineers (SMPTE) authority.

13. A system comprising:

an encoding unit to encode a plurality of streams containing a content stream to be broadcast to a plurality of receivers;

a packetizer coupled to the encoding unit to packetize the encoded streams; and a data injector coupled to the encoding unit to inject private user data, the data injector comprising: an identifier inserter to insert a user data identifier (UDI) into a video sequence within the content stream encoded according to a media standard, wherein the media standard defines a syntax that defines a location for a pre-defined data structure, wherein the pre-defined data structure is a variable length data structure and a format of the pre-defined data structure is defined by a value included in the UDI, the UDI being registered with a registration authority that is responsible for registering a format identifier for the content stream, wherein the media standard is an Motion Picture Experts Group (MPEG) standard, and wherein the UDI is different from an Advanced Television Systems Committee (ATSC) standard identifier, and a data inserter to insert private user data into the video sequence at the location for the pre-defined data structure, wherein the private user data is information, data, or content embedded by a private entity, wherein the UDI is selected to be matched with a pre-defined identifier established by the private entity, wherein the pre-defined identifier is used in the receiving end to allow a decoder to extract the private user data.

14. The system of claim 13 wherein the syntax defines the location of the pre-defined data structure using a 32-bit user data start code (user_data_start_code), and wherein the UDI is a 32-bit code (user_data_identifier).

15. The system of claim 14 wherein the registration authority is a Society of Motion Picture and Television Engineers (SMPTE) authority.

* * * * *